(12) United States Patent
Tsurumi et al.

(10) Patent No.: US 11,621,967 B2
(45) Date of Patent: Apr. 4, 2023

(54) ELECTRONIC CONTROL UNIT, ELECTRONIC CONTROL SYSTEM, AND RECORDING MEDIUM

(71) Applicant: Panasonic Intellectual Property Management Co., Ltd., Osaka (JP)

(72) Inventors: Junichi Tsurumi, Osaka (JP); Takamitsu Sasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 46 days.

(21) Appl. No.: 17/354,687

(22) Filed: Jun. 22, 2021

(65) Prior Publication Data

US 2021/0320932 A1 Oct. 14, 2021

Related U.S. Application Data

(63) Continuation of application No. PCT/JP2019/049617, filed on Dec. 18, 2019.

(30) Foreign Application Priority Data

Dec. 28, 2018 (JP) .............................. JP2018-247448

(51) Int. Cl.
*H04L 9/40* (2022.01)

(52) U.S. Cl.
CPC ...... *H04L 63/1416* (2013.01); *H04L 63/1425* (2013.01); *H04L 63/1466* (2013.01); *H04L 63/20* (2013.01)

(58) Field of Classification Search
CPC .......................... H04L 63/1425; H04L 63/1466
(Continued)

(56) References Cited

U.S. PATENT DOCUMENTS 6,597,777 B1 * 7/2003 Ho ........................ H04L 43/00
379/112.01
7,383,191 B1 * 6/2008 Herring .................. H04L 43/10
705/1.1
(Continued)

FOREIGN PATENT DOCUMENTS

JP       2014-146868        8/2014
JP       2017-017608 A      1/2017
(Continued)

OTHER PUBLICATIONS

Written Opinion of the International Searching Authority issued in International Pat. Appl. No. PCT/JP2019/049617, dated Mar. 10, 2020, along with an English language translation thereof.
(Continued)

*Primary Examiner* — Badrinarayanan
(74) *Attorney, Agent, or Firm* — Greenblum & Bernstein, P.L.C.

(57) ABSTRACT

An electronic control unit that is capable of more accurately determining an event that has occurred in a network installed in a mobile body such as a vehicle, the electronic control unit including: a transmitter-receiver that receives first messages transmitted from a first ECU included in an in-vehicle network; and an attack determiner that, when a first message among the first messages received by the transmitter-receiver is determined to have an anomaly, determines whether a cause of the anomaly is an attack on the in-vehicle network.

11 Claims, 7 Drawing Sheets

(58) Field of Classification Search
USPC .......................................................... 726/22
See application file for complete search history.

(56) References Cited

U.S. PATENT DOCUMENTS

| | | | |
|---|---|---|---|
| 7,640,589 B1* | 12/2009 | Mashevsky | G06F 21/56 |
| | | | 726/25 |
| 8,209,756 B1* | 6/2012 | Guruswamy | H04L 63/1466 |
| | | | 713/188 |
| 10,601,843 B2 | 3/2020 | Tanabe et al. | |
| 2011/0023114 A1* | 1/2011 | Diab | G06F 9/4856 |
| | | | 709/224 |
| 2015/0358351 A1* | 12/2015 | Otsuka | H04L 12/66 |
| | | | 726/23 |
| 2017/0010930 A1* | 1/2017 | Dutta | G06F 11/3476 |
| 2017/0310701 A1* | 10/2017 | Cudak | H04L 63/1458 |
| 2018/0167360 A1 | 6/2018 | Maeda et al. | |
| 2019/0149562 A1* | 5/2019 | Maeda | H04W 12/61 |
| | | | 726/23 |
| 2019/0228353 A1* | 7/2019 | Gefen | G06Q 10/067 |
| 2019/0246875 A1 | 8/2019 | Mizoguchi et al. | |
| 2021/0126925 A1* | 4/2021 | Watanabe | H04L 63/1466 |

FOREIGN PATENT DOCUMENTS

| | | |
|---|---|---|
| JP | 2017-038291 | 2/2017 |
| JP | 2017-073765 | 4/2017 |
| JP | 2018-152745 | 9/2018 |
| JP | 2018-182725 | 11/2018 |
| WO | 2018/079329 A1 | 5/2018 |
| WO | 2018/179329 A1 | 12/2019 |

OTHER PUBLICATIONS

Decision to Grant a Patent issued in Japanese Pat. Appl. No. 2020-563136, dated Apr. 26, 2022, along with an English language translation thereof.

Fukuda et al., "Time-series data analysis for general-purpose attack detection in CAN communication", Proceedings of Computer Security Symposium 2018, section 4.2, Oct. 15, 2018, pp. 1120-1127, along with a partial English language translation.

Kurachi et al., "Proposal of the error frame monitoring system with improved Controller Area Network (CAN) controller", Proceedings of Computer Security Symposium 2015, vol. 2015, No. 3, section 1.3, Oct. 14, 2015, pp. 110-115, along with a partial English language translation.

Tanabe et al., "Proposal of Multi-Layer Cooperative CAN Filtering Technology for In-Vehicle Gateway ECU", 2016 Symposium on Cryptography and Information Security, sections 4-6, Jan. 19, 2016, pp. 1-8, along with a partial English language translation.

Ujiie et al., "Proposal of CAN Filtering Technology for In-vehicle Network", The 32nd Symposium on Cryptography and Information Security, sections 3.3, 3.4, Jan. 20, 2015, pp. 1-7, along with a partial English language translation.

International Search Report issued in International Pat. Appl. No. PCT/JP2019/049617, dated Mar. 10, 2020, along with an English language translation thereof.

* cited by examiner

| Characteristic | | Anomaly | | | | |
|---|---|---|---|---|---|---|
| | | Attack | | Not attack | | |
| | | Additional attack | Replacement attack | Breakdown | Bug | |
| Data amount | | Increase (attack characteristic 1) | No change | No change or 0 | Due to bug | |
| Change in data | | Coexistence of normal and anomaly (attack characteristic 2) | Steeper than normal | Due to breakdown | Due to bug | |
| Diagnostic packet | | Unobserved | Observed (attack characteristic 3) | Unobserved | Unobserved | |
| Coincidence | | Coincidence in related data (attack characteristic 4) | Coincidence in related data (attack characteristic 4) | Single occurrence | Single occurrence | |

ELECTRONIC CONTROL UNIT, ELECTRONIC CONTROL SYSTEM, AND RECORDING MEDIUM

CROSS REFERENCE TO RELATED APPLICATIONS

This is a continuation application of PCT International Application No. PCT/JP2019/049617 filed on Dec. 18, 2019, designating the United States of America, which is based on and claims priority of Japanese Patent Application No. 2018-247448 filed on Dec. 28, 2018.

FIELD

The present disclosure relates to an electronic control unit, an electronic control system, and a recording medium that perform processing on an anomalous message.

BACKGROUND

Conventionally proposed is a network device for detecting and providing protection against an attack that introduces unauthorized data into a network system, such as an in-vehicle network, to cause a vehicle to malfunction (see Patent Literature (PTL) 1).

When this network device receives first data having the same identifier as reference received data, and a reception interval between the received data and the first data is shorter than a predetermined period, the network device determines whether an anomaly has occurred. In this determination, when the network device receives second data having the same identifier as the first data before the elapse of the predetermined period from a reception time of the reference received data, the network device determines that the anomaly has occurred.

CITATION LIST

Patent Literature

PTL 1: Japanese Unexamined Patent Application Publication No. 2014-146868

SUMMARY

However, the network device according to PTL 1 can be improved upon.

In view of this, the present disclosure provides an electronic control unit capable of improving upon the above related art.

An electronic control unit according to one aspect of the present disclosure includes: a receiver that receives first messages transmitted from a first device included in a network installed in a mobile body; and a determiner that, when a first message among the first messages received by the receiver is determined to have an anomaly, determines whether a cause of the anomaly is an attack on the network, and outputs a result of the determination.

It should be noted that these general or specific aspects may be implemented using a system, a method, an integrated circuit, a computer program, or a computer-readable recording medium such as CD-ROM, or may be implemented using any combination of systems, methods, integrated circuits, computer programs, or recording media.

An electronic control unit of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT (Underlying Knowledge Forming the Basis of the Present Disclosure)

In recent years, more and more vehicles are connected to the Internet to obtain traffic congestion information, traffic information, etc. However, there is a possibility that such vehicles are cyberattacked. In such a cyberattack, an attacker accesses an in-vehicle network by, for example, connecting an unauthorized device to the in-vehicle network, and transmits an unauthorized message to the in-vehicle network, thereby performing unauthorized rewriting of firmware of an ECU of the in-vehicle network or unauthorized control of various actuators in a vehicle via the ECU, etc. Generally, the following three functions are required to prepare for such a cyberattack (hereinafter referred to as an attack). The first function is a function of providing protection against a known attack. The second function is a function of detecting an attack or a symptom of the attack. The third function is a function of updating the first function and the second function. Here, in order to detect and provide protection against a new attack, that is, in order to achieve the third function, it is necessary to analyze how the new attack is carried out using what route or method.

However, when, for example, a server monitors many vehicles and analyzes anomalies of these vehicles, many notifications about the anomalies are expected to be transmitted to the server. As a result, there is a possibility that a communication network (e.g., the Internet) connecting the server and the vehicles is flooded. In view of the above, it is desirable that only notifications about attacks be transmitted exhaustively from the vehicles to the server.

Although the network device according to PTL 1 detects an anomaly to detect and protect against a fraud, the network device does not determine whether a cause of the detected anomaly is an attack. To put it another way, a cause of an anomaly is assumed to be only an attack. As stated above, in a conventionally proposed anomaly detection method for a network in a vehicle, a cause of an anomaly is not classified into an attack or a breakdown that is not an attack.

For example, when a cause of an anomaly is a breakdown, it is necessary to identify a component determined to have an anomaly, and replace the component. Moreover, when a cause of an anomaly is an attack, it is necessary to identify a route and a method used by the attack, and consider preparing for the attack. Here, when a cause of an anomaly is wrongly determined to be an attack regardless of the cause of the anomaly being a breakdown, such a determination makes it difficult to identify a route and a method used by the attack; and even if the route and the method are identified, it is impossible to address the anomaly. Furthermore, when a cause of an anomaly is wrongly determined to be a breakdown regardless of the cause of the anomaly being an attack, there may arise a problem that the same anomaly occurs even when a component is replaced.

As stated above, the network device according to PTL 1 does not sufficiently determine an event that has occurred in the in-vehicle network.

In view of this, the present disclosure provides, for example, an electronic control unit capable of more accurately determining an event that has occurred in a network installed in a mobile body such as a vehicle.

An electronic control unit according to one aspect of the present disclosure includes: a receiver that receives first messages transmitted from a first device included in a network installed in a mobile body; and a determiner that, when a first message among the first messages received by the receiver is determined to have an anomaly, determines whether a cause of the anomaly is an attack on the network, and outputs a result of the determination.

With this configuration, since, when the first message is determined to have the anomaly, the cause of the anomaly that the first message has been determined to have is the attack, it is possible to more accurately determine an event that has occurred in the network. To put it another way, it is possible to determine whether the cause of the anomaly is an attack or a cause other than the attack such as a breakdown or bug. As a result, it is possible to take appropriate measures to the anomaly. Specifically, when the cause of the anomaly is a breakdown, it is possible to address the anomaly appropriately by replacing a broken-down component. In addition, when the cause of the anomaly is an attack, it is possible to address the anomaly appropriately by identifying a route and a method used by the attack and taking measures to the route and the method.

Moreover, when the determiner determines that the cause of the anomaly is not the attack, the determiner may further output information indicating a possibility of a breakdown of the first device. With this configuration, since the information indicating the possibility of the breakdown is outputted when the cause of the anomaly is not the attack, it is possible to address the anomaly appropriately by, for example, replacing a broken-down component.

Moreover, the determiner may determine whether a first data amount of the first messages transmitted per unit of time has increased from a second data amount of normal first messages transmitted per unit of time, and when the determiner determines that the first data amount has increased from the second data amount, the determiner may determine that the cause of the anomaly is the attack.

With this configuration, since it is determined whether an attack characteristic that adds an anomalous message to a normal message has appeared, it is possible to determine such an attack as the cause of the anomaly appropriately.

Moreover, the determiner may determine whether the first messages include an anomalous first message and a normal first message, and when the determiner may determine that the first messages include the anomalous first message and the normal first message, the determiner determines that the cause of the anomaly is the attack.

With this configuration, since it is determined whether an attack characteristic that adds an anomalous message to a normal message has appeared, it is possible to determine such an attack as the cause of the anomaly appropriately.

Moreover, the determiner may determine whether a second message that is determined to have an anomaly has been transmitted from a second device included in the network in a same time period with the first message determined to have the anomaly, and when the determiner determines that the second message has been transmitted, the determiner may determine that a cause of the anomaly is the attack, the second message being related to the first message determined to have the anomaly.

With this configuration, since it is determined whether an attack characteristic has appeared, it is possible to determine the attack as the cause of the anomaly appropriately.

Moreover, the determiner may determine whether a third message has been transmitted to the network when the mobile body is moving, and when the determiner determines that the third message has been transmitted, the determiner may determine that the cause of the anomaly is the attack, the third message being transmitted from outside the mobile body to the network when the mobile body is not moving. Alternatively, the determiner may determine whether the first message determined to have the anomaly has been transmitted when transmission of a first message is stopped by a diagnostic packet, and when the determiner determines that the first message determined to have the anomaly has been transmitted, the determiner may determine that the cause of the anomaly is the attack.

With this configuration, since it is determined whether an attack characteristic that replaces a normal message with an anomalous message has appeared, it is possible to determine such an attack as the cause of the anomaly appropriately.

Moreover, the determiner may determine whether at least one characteristic that appears due to an attack has appeared in the network within a predetermined time period, and when the determiner determines that the at least one characteristic has appeared, the determiner may determine that the cause of the anomaly is the attack.

With this configuration, it is possible to more accurately determine the attack as the cause of the anomaly.

Moreover, when the determine determines that the cause of the anomaly is the attack, the determiner may identify a type of the attack. For example, when the determiner determines that a first data amount of the first messages transmitted per unit of time has increased from a second data amount of normal first messages transmitted per unit of time, the determiner may identify, as the type of the attack, an additional attack that adds an anomalous message to a normal message. Furthermore, when the determiner determines that the first messages include an anomalous first message and a normal first message, the determiner may identify, as the type of the attack, an additional attack that adds an anomalous message to a normal message. In addition, when the determiner determines that a second message has been transmitted to the network when the mobile body is moving, the determiner may identify, as the type of the attack, a replacement attack that replaces a normal message with an anomalous message, the second message being transmitted from outside the mobile body to the network when the mobile body is not moving. Alternatively, when the determiner determines that a first message determined to have the anomaly has been transmitted when transmission of the first message is stopped by a diagnostic packet, the determiner may identify, as the type of the attack, a replacement attack that replaces a normal message with an anomalous message.

With this configuration, it is possible to more accurately determine an attack determined as an event that has occurred in the network.

An electronic control system according to one aspect of the present disclosure includes: an anomaly determining device including a receiver that receives messages transmitted from a device included in a network installed in a mobile body, and an anomaly determiner that determines whether the messages received by the receiver are anomalies; and an attack determining device that, when the anomaly determiner determines that a message among the messages received by the receiver has an anomaly, determines whether a cause of the anomaly is an attack on the network, and outputs a result of the determination.

With this configuration, since, when the message is determined to have the anomaly, the cause of the anomaly that the message has been determined to have is the attack, it is possible to more accurately determine an event that has occurred in the network. To put it another way, it is possible to determine whether the cause of the anomaly is an attack or a cause other than the attack such as a breakdown or bug. As a result, it is possible to take appropriate measures to the anomaly. Specifically, when the cause of the anomaly is a breakdown, it is possible to address the anomaly appropriately by replacing a broken-down component. In addition, when the cause of the anomaly is an attack, it is possible to address the anomaly appropriately by identifying a route and a method used by the attack and taking measures to the route and the method.

It should be noted that these general or specific aspects may be implemented using a system, a method, an integrated circuit, a computer program, or a computer-readable recording medium such as CD-ROM, or may be implemented using any combination of systems, methods, integrated circuits, computer programs, or recording media.

Hereinafter, an embodiment will be described in detail with reference to the drawings.

It should be noted that the embodiment described below represents a generic or specific example. The numerical values, shapes, materials, structural components, the arrangement and connection of the structural components, steps, and the order of the steps, etc. shown in the following embodiment are mere examples, and are not intended to limit the scope of the present disclosure. Moreover, among the structural components of the following embodiment, those not recited in any one of the independent claims that indicate the broadest concepts of the present disclosure are described optional structural components. Furthermore, the figures are schematic diagrams and are not necessarily precise illustrations. In addition, identical structural components are given the same reference signs in the figures.

[Embodiment]

Figure 1:
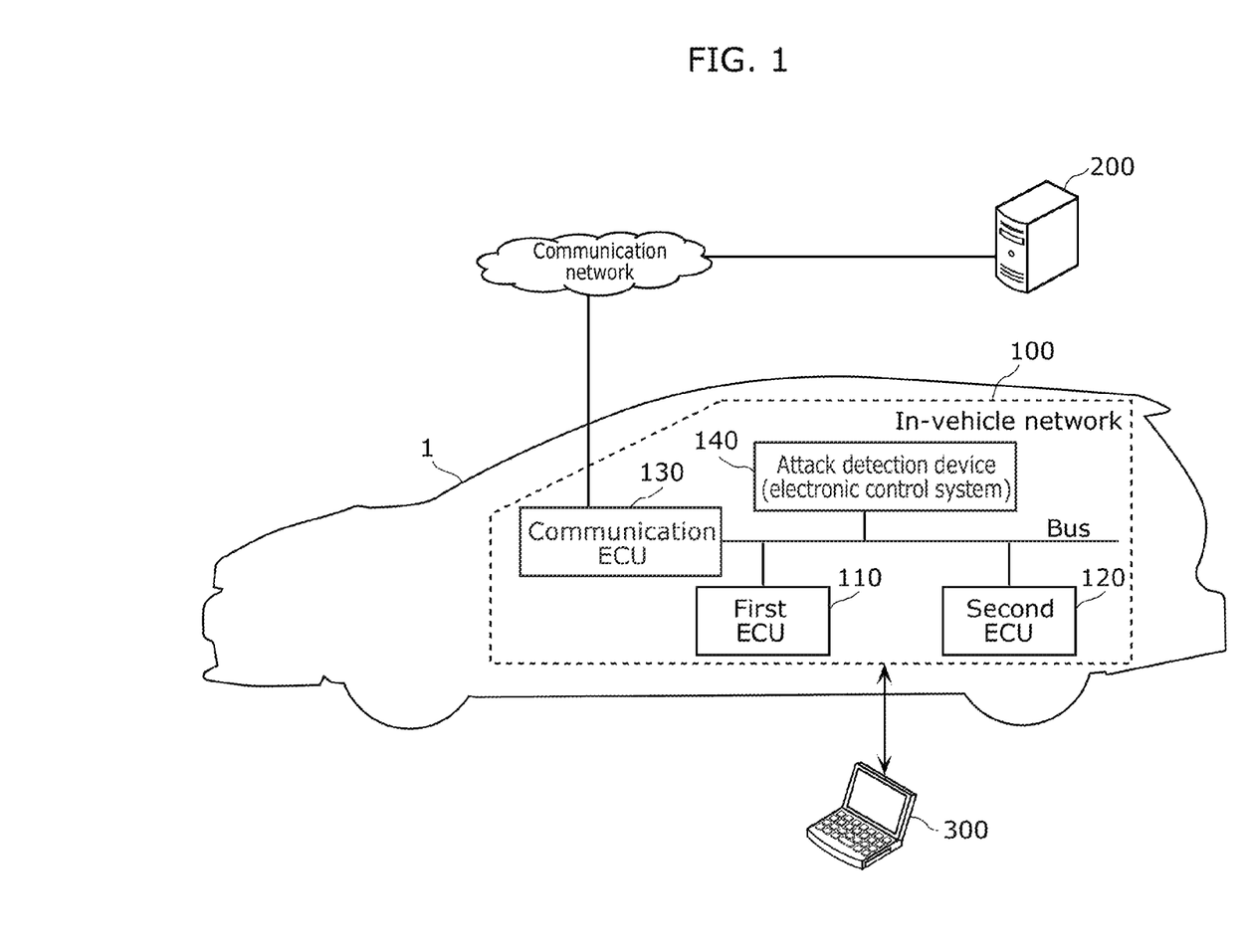
FIG. 1 is a diagram showing an exemplary configuration of a communication system including an in-vehicle network in an embodiment.

FIG. 1 is a diagram showing an exemplary configuration of a communication system including an in-vehicle network in an embodiment.

This communication system includes in-vehicle network 100, server 200, and diagnostic device 300.

In-vehicle network 100 is installed in vehicle 1 such as an automobile and controls, for example, the traveling of vehicle 1. Such in-vehicle network 100 is a network system including electronic control units (ECUs) connected to each other via a bus (i.e., a network bus). The ECUs communicate with each other in accordance with a controller area network (CAN) protocol specified by ISO 11898. To put it another way, each of the ECUs transmits and receives CAN frames. Types of a frame include, for example, a data frame, a remote frame, an overload frame, and an error frame. Among these types, a data frame is hereinafter referred to as a message (or a CAN message).

Server 200 communicates with in-vehicle network 100 via a communication network outside vehicle 1, such as the Internet. For example, server 200 collects, as a log, information transmitted from in-vehicle network 100, and analyzes the log.

Diagnostic device 300 is used to diagnose in-vehicle network 100. Specifically, diagnostic device 300 diagnoses in-vehicle network 100 when vehicle 1 is standing. At this time, diagnostic device 300 transmits into in-vehicle network 100, as a diagnostic message, a diagnostic packet for stopping processing of each ECU etc. included in in-vehicle network 100. Instead of the stopped ECU, diagnostic device 300 transmits a message into in-vehicle network 100 and monitors the processing of the ECU relative to the message, thereby diagnosing in-vehicle network 100.

In an example shown by FIG. 1, in-vehicle network 100 includes first ECU 110, second ECU 120, and communication ECU 130 as ECUs connected to each other via a bus, and further includes attack detection device 140. It should be noted that although in-vehicle network 100 includes the three ECUs in the example shown by FIG. 1, the number of ECUs is not limited to three and may be two or at least four.

Each of first ECU 110 and second ECU 120 is a device for performing control of vehicle 1 such as acceleration, braking, or steering, etc of vehicle 1.

Communication ECU 130 communicates with, for example, server 200 via a communication network outside vehicle 1. For this reason, each ECU other than communication ECU 130 and attack detection device 140 included in in-vehicle network 100 are capable of communicating with server 200 via communication ECU 130.

It should be noted that each of ECUs (i.e., first ECU 110, second ECU 120, communication ECU 130) is, for example, a device including, as hardware, a digital circuit such as a processor (i.e., a microprosessor) and memory, an analog circuit, or a communication circuit, etc. The memory is read-only memory (ROM) or random-access memory (RAM), etc., and is capable of storing a program (i.e., software or a computer program) executed by the processor. Each ECU implements various functions for controlling vehicle 1 and the like by, for example, the processor operating in accordance with the program. The program is configured with a combination of operation codes indicating instructions to the processor, so as to implement a predetermined function.

Attack detection device 140 is a device that detects an attack on in-vehicle network 100 or vehicle 1 including in-vehicle network 100, and is also referred to as an electronic control system. Moreover, attack detection device 140 may be configured as an ECU, and when in-vehicle network 100 includes a gateway, the gateway may include attack detection device 140. It should be noted that although attack detection device 140 is included in in-vehicle network 100 in the present embodiment, attack detection device 140 may be included in server 200.

Attack detection device 140 in the present embodiment receives a message that passes through the bus of in-vehicle network 100 and determines whether the message has an anomaly. Moreover, when attack detection device 140 determines that the message has the anomaly, attack detection device 140 further determines whether a cause of the anomaly is an attack on in-vehicle network 100.

Figure 2:
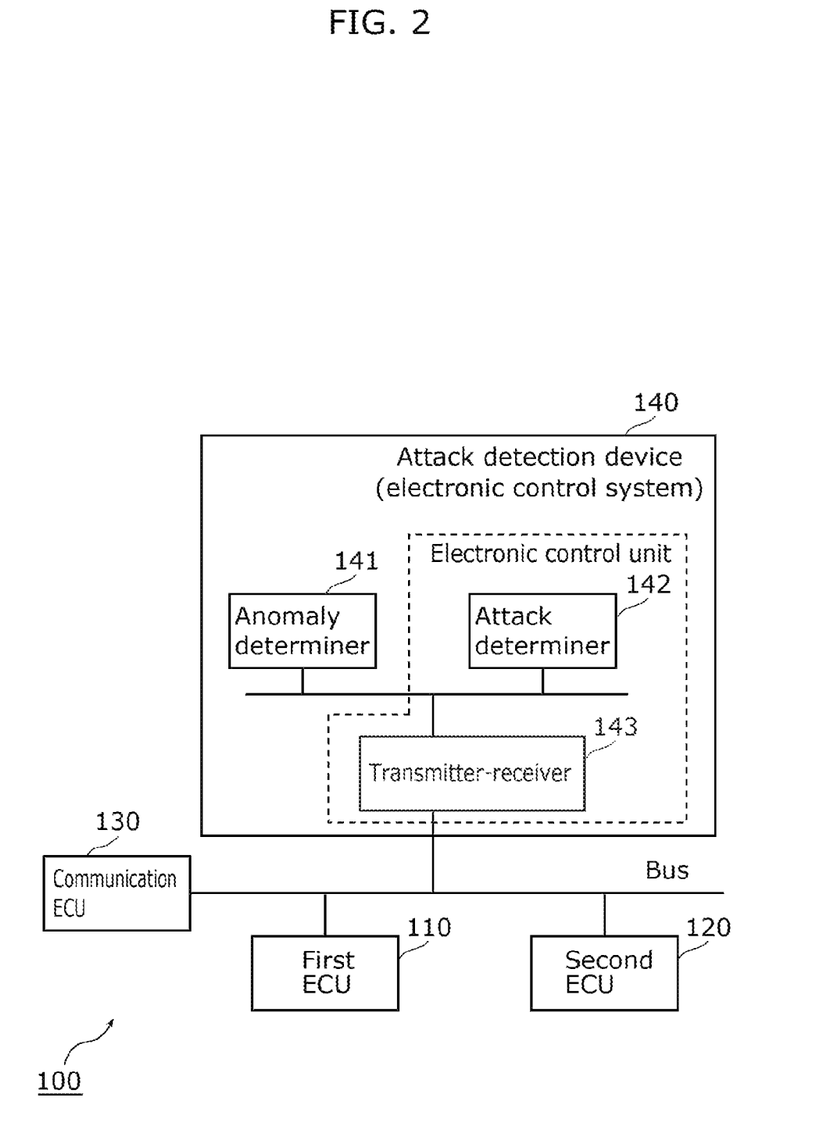
FIG. 2 is a block diagram showing an exemplary configuration of an attack detection device in the embodiment.

FIG. 2 is a block diagram showing an exemplary configuration of attack detection device 140 in the present embodiment.

Attack detection device 140 includes anomaly determiner 141, attack determiner 142, and transmitter-receiver 143.

Transmitter-receiver 143 receives a message transmitted from each of first ECU 110, second ECU 120, and communication ECU 130 via the bus. Moreover, transmitter-receiver 143 transmits via the bus information based on a processing result of each of anomaly determiner 141 and attack determiner 142. This information may be transmitted, for example, to server 200 via communication ECU 130 and the communication network.

Anomaly determiner 141 determines whether a message received by transmitter-receiver 143 has an anomaly.

Attack determiner 142 determines whether a cause of the anomaly that the message has been determined to have by anomaly determiner 141 is an attack on in-vehicle network 100. For example, when attack determiner 142 determines that the cause of the anomaly is the attack, attack determiner 142 notifies a user, server 200, or at least one of the devices included in in-vehicle network 100 that the attack has taken place.

For example, attack determiner 142 may notify the user of vehicle 1 that an attack has taken place, by causing a display device of vehicle 1 to display a text message. Examples of such a text message include "There is a possibility that an attack has taken place, so please stop the vehicle and check the update of software." Moreover, attack determiner 142 may notify server 200 that an attack has taken place, by transmitting a log of a message determined to have an anomaly due to the attack and a log of another message related to the message. Furthermore, attack determiner 142 may notify at least one of the devices included in in-vehicle network 100 that an attack has taken place, by transmitting to the at least one device via the bus a signal for limiting or reducing the operation of vehicle 1. Consequently, the at least one device included in in-vehicle network 100 causes vehicle 1 to, for example, slow down gradually and stop at an available parking place.

When attack determiner 142 determines that the cause of the anomaly is not an attack, attack determiner 142 may notify the user, server 200, or at least one of the devices included in in-vehicle network 100 that a breakdown has occurred. For example, the display device of vehicle 1 notifies the user that a breakdown has occurred, by displaying a text message. Examples of such a text message include "There is a possibility that the vehicle has broken down, so please ask a car dealer to provide vehicle maintenance." In other words, in the present embodiment, when attack determiner 142 determines that the cause of the anomaly is not an attack, attack determiner 142 may output information indicating a possibility that a device such as first ECU 110 or second ECU 120 has broken down. Consequently, since the information indicating the possibility of the breakdown is outputted when the cause of the anomaly is not the attack, it is possible to address the anomaly appropriately by, for example, replacing a broken-down component.

Here, in the present embodiment, transmitter-receiver 143 and attack determiner 142 constitute an electronic control unit. In other words, as in the present embodiment, this electronic control unit may be included together with anomaly determiner 141 in attack detection device 140, or may be included in a device different from a device including anomaly determiner 141. Moreover, anomaly determiner 141 may be included in one of in-vehicle network 100 and server 200, and the electronic control unit may be included in the other of in-vehicle network 100 and server 200. In view of the above, in the present embodiment, even when the electronic control unit and anomaly determiner 141 are included in one device or separately included in two mutually different devices, a system comprising the electronic control unit and anomaly determiner 141 is referred to as an electronic control system.

As stated above, the electronic control unit according to the present embodiment includes: transmitter-receiver 143 that receives first messages from first ECU 110 included in in-vehicle network 100; and attack determiner 142 that, when a first message among the first messages received by transmitter-receiver 143 is determined to have an anomaly, determines whether a cause of the anomaly is an attack on in-vehicle network 100, and outputs a result of the determination. It should be noted that when, instead of a first message, a second message transmitted from second ECU 120 is determined to have an anomaly, attack determiner 142 may determine whether a cause of the anomaly that the second message has been determined to have is an attack on in-vehicle network 100. In other words, a device that transmits a target message to be determined may be first ECU 110, second ECU 120, or another device included in in-vehicle network 100. Moreover, in the above example, an output of an attack determination result is performed as a notification to the user of vehicle 1, server 200, or at least one of the devices included in in-vehicle network 100.

Accordingly, since, when a message is determined to have an anomaly, a cause of the anomaly that the message has been determined to have is an attack, it is possible to more accurately determine an event that has occurred in in-vehicle network 100. To put it another way, it is possible to determine whether the cause of the anomaly is an attack or a cause other than the attack such as a breakdown or bug. As a result, it is possible to take appropriate measures to the anomaly. Specifically, when the cause of the anomaly is a breakdown, it is possible to address the anomaly appropriately by replacing a broken-down component. Moreover, when the cause of the anomaly is an attack, it is possible to address the anomaly appropriately by identifying a route and a method used by the attack and taking measures to the route and the method.

Figure 3:
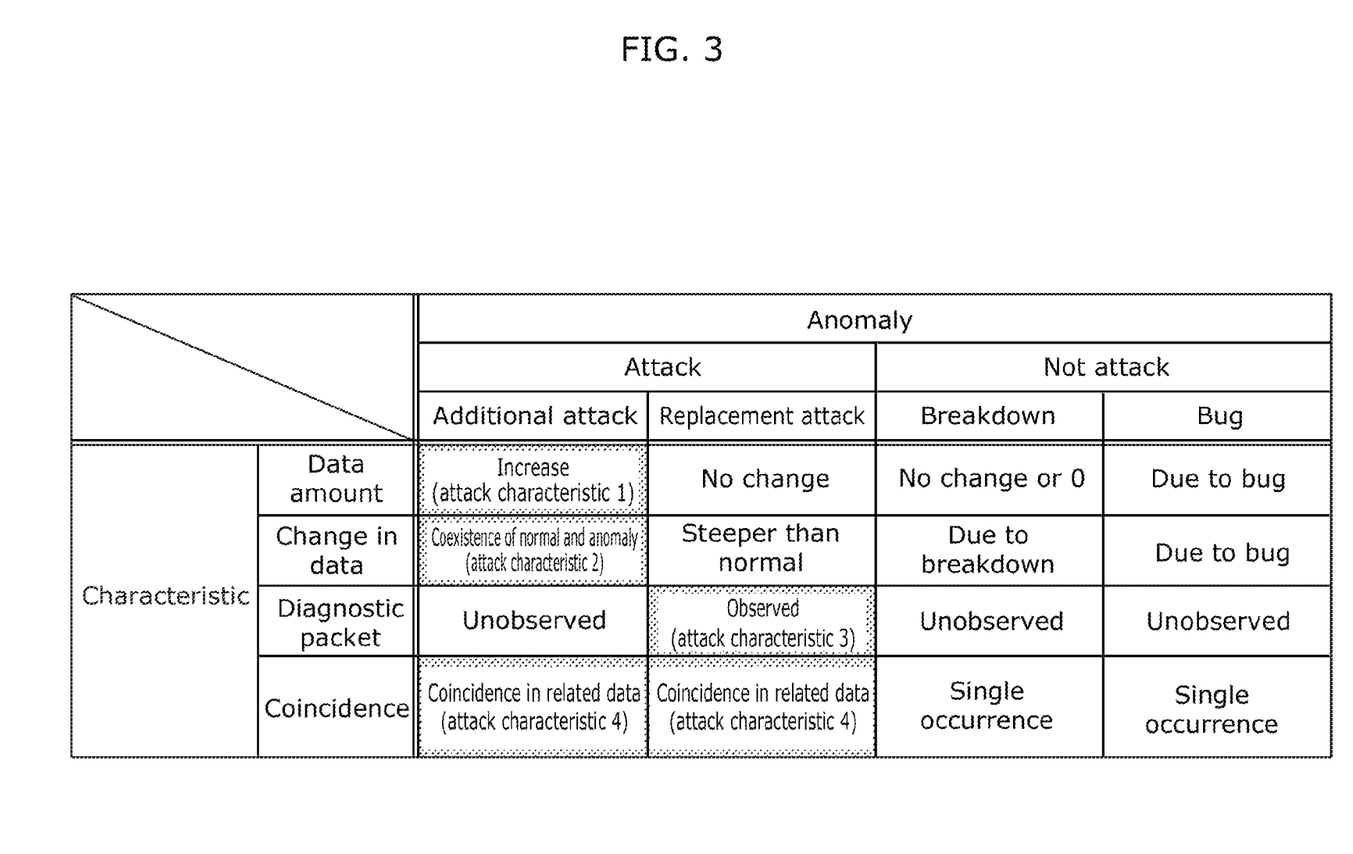
FIG. 3 is a diagram showing causes of an anomaly and characteristics of the causes.

FIG. 3 is a diagram showing causes of an anomaly and characteristics of the causes.

A cause of an anomaly is an attack or a cause other than the attack. In addition, an attack is of the following two types, for example. The first type is an adding-type attack (hereinafter referred to as an additional attack) that adds an anomalous first message to a normal message. In other words, the attack of the first type adds an anomalous message to a network through which a normal message is periodically passing. The second type is a replacing-type attack (hereinafter referred to as a replacement attack) that replaces a normal message with an anomalous message. To put it another way, the attack of the second type stops a normal message from periodically passing through a network, and causes an anomalous message instead of the normal message to periodically pass through the network. Examples of the cause other than the attack include a breakdown and a bug.

Here, the additional attack has three characteristics. The first characteristics (hereinafter also referred to as attack characteristic 1) is that a data amount increases. Since an anomalous message is further passed through a network when a normal message is periodically passing through the network, a data amount per unit of time increases. The second characteristic (hereinafter also referred to as attack characteristic 2) is that a normal message and an anomalous message coexist in the same time period. For example, a normal message and an anomalous message are transmitted alternately. The third characteristic (hereinafter also referred to as attack characteristic 4) is that anomalies coincide in various types of mutually related messages. When an attack takes place, it is rare that only one type of an anomalous message occurs independently. In an attack intended to take unauthorized control of the steering wheel of vehicle 1, it is assumed that the traveling speed of vehicle 1 is made look like a low speed and a steering indicating angle of the steering wheel is increased suddenly. In this case, anomalies coincide in data of a message for controlling a steering angle and data of a message for notifying a traveling speed. As stated above, the third characteristic is that anomalies coincide in various types of mutually related messages. It should be noted that a type of a message may be defined by an ID (specifically a CAN-ID) included in the message. In addition, types of mutually related messages may be predetermined.

The replacement attack has three characteristics. The first characteristic (hereinafter also referred to as attack characteristic 3) is that the above-described diagnostic packet passes through a network as a diagnostic message even though a vehicle is traveling. In other words, when a diagnostic packet passes through an in-vehicle network of a traveling vehicle, there is a high possibility that the diagnostic packet is an unauthorized packet, transmission of a normal message from an ECU is stopped in an unauthorized manner, and instead of the normal message, an unauthorized message is passed through the in-vehicle network. The second characteristic (hereinafter also referred to as attack characteristic 3a) is accompanied by attack characteristic 3 and is that even though transmission of a message is stopped by a diagnostic packet in an unauthorized manner, the message is observed. It should be noted that although attack detection device 140 may use attack characteristic 3 in determining whether a cause of an anomaly is an attack in the following description, attack characteristic 3 may be replaced with attack characteristic 3a. Even when attack characteristic 3 is replaced with attack characteristic 3a, the same advantageous effect can be produced as the case in which attack characteristic 3 is used. Moreover, attack characteristic 3a may be used in addition to attack characteristic 3. The third characteristic is that anomalies coincide in various types of mutually related messages, as with the third attack characteristic of the additional attack. To put it another way, the third characteristic of the replacement attack is the same as the third characteristic of the additional attack and is equivalent to attack characteristic 4.

In contrast, attack characteristics 1 to 4 and 3a neither appear nor become prominent in a cause other than an attack.

In light of the above, attack detection device 140 in the present embodiment determines whether a cause of an anomaly is an attack, using such attack characteristics.

Figure 4:
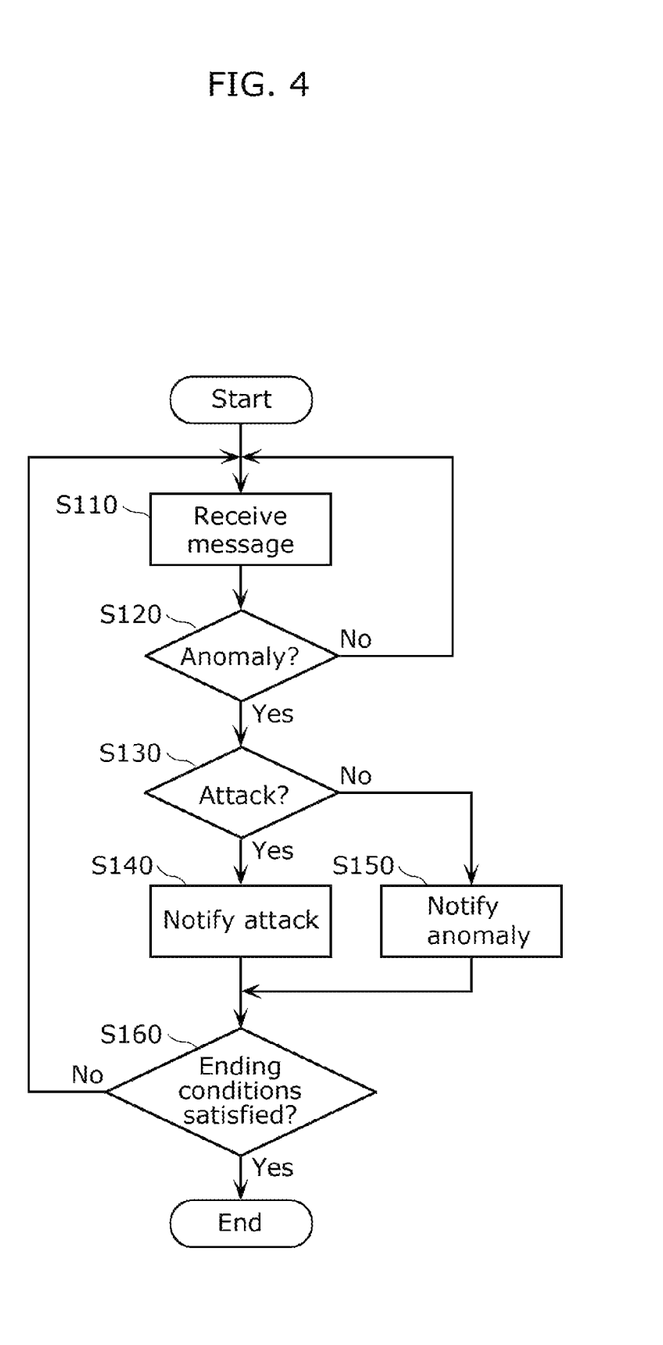
FIG. 4 is a flow chart showing an example of an overall processing operation by the attack detection device in the embodiment.

FIG. 4 is a flow chart showing an example of an overall processing operation by attack detection device 140.

Transmitter-receiver 143 of attack detection device 140 receives a message that passes through a bus (step S110). Next anomaly determiner 141 determines whether the message received by transmitter-receiver 143 has an anomaly (step S120). For example, when a value indicated by a target message to be determined or an amount of change of the value is greater or less than a predetermined number, anomaly determiner 141 determines that the target message has an anomaly. It should be noted that the amount of change of the value indicated by the target message is, for example, a difference between the value of the target message and a value indicated by a message that is of the same type as the target message and is transmitted before the target message. Alternatively, anomaly determiner 141 may determine whether the target message has an anomaly, based on a transmission cycle of a message that is of the same type as the target message. For example, when the transmission cycle is shorter or longer than a predetermined cycle, anomaly determiner 141 determines that the target message has the anomaly.

Then, when anomaly determiner 141 determines that the message has the anomaly (Yes in step S120), attack determiner 142 determines whether a cause of the anomaly is an attack (step S130). For example, anomaly determiner 141 determines whether a cause of an anomaly is an attack, based on attack characteristics 1 to 4 shown by FIG. 3.

Here, when attack determiner 142 determines that the cause of the anomaly is the attack (Yes in step S130), attack determiner 142 notifies a user, server 200, or at least one of the devices included in in-vehicle network 100 that the attack has taken place (step S140).

On the other hand, when attack determiner 142 determines that the cause of the anomaly is not the attack (No in step S130), attack determiner 142 notifies the user, server 200, or at least one of the devices included in in-vehicle network 100 that the anomaly has occurred (step S150). At this time, attack determiner 142 may notify that the cause of the anomaly is not the attack, that is, a breakdown or a bug has occurred.

After that, transmitter-receiver 143 determines whether to end the reception of the message (step S160). For example, when ending conditions such as a case in which the power of in-vehicle network 100 is turned off are satisfied, transmitter-receiver 143 ends the reception of a message. In contrast, when the ending conditions are not satisfied, transmitter-receiver 143 repeatedly performs processing from step S110.

Here, as stated above, attack determiner 142 uses attack characteristics 1 to 4 shown by FIG. 3 when attack determiner 142 determines whether a cause of the anomaly is an attack in step S130.

For example, attack determiner 142 may use attack characteristic 1, that is, an increase in data amount. Specifically, the message determined to have the anomaly is a first message and is transmitted from, for example, first ECU 110. Moreover, in in-vehicle network 100, each of first messages including the first message determined to have the anomaly is transmitted sequentially via the bus. It should be noted that the first messages are of the same type, for example. In other words, the first messages have the same ID. At this time, attack determiner 142 determines whether a first data amount of the first messages transmitted per unit of time has increased from a second data amount of normal first messages transmitted per unit of time. Then, when attack determiner 142 determines that the first data amount has increased, attack determiner 142 determines that a cause of the anomaly is an attack.

For example, attack determiner 142 adds up a data amount of each of at least one first message received by transmitter-receiver 143 within a unit of time from when an anomalous first message is received by transmitter-receiver 143. In this way, a first data amount is calculated. It should be noted that this first data amount includes a data amount of the anomalous first message. Attack determiner 142 compares the first data amount and a second data amount, and when the first data amount is greater than the second data amount, attack determiner 142 determines that the first data amount has increased. The second data amount may be a predetermined data amount. In addition, the unit of time may be greater than or equal to a transmission cycle of a normal first message.

As stated above, in the present embodiment, since it is determined whether an attack characteristic that adds an anomalous message to a normal message has appeared, it is possible to determine such an attack, that is, the additional attack as the cause of the anomaly appropriately.

Moreover, attack determiner 142 may use attack characteristic 2, that is, the coexistence of a normal message and an anomalous message as a change in data. Specifically, attack determiner 142 determines whether the above-mentioned first messages include an anomalous first message and a normal first message, and when attack determiner 142 determines that the first messages include the anomalous first message and the normal first message, attack determiner 142 determines that the cause of the anomaly is an attack.

For example, attack determiner 142 determines whether an anomalous first message has been received by transmitter-receiver 143 within a predetermined period from when a normal first message is received by transmitter-receiver 143. At this time, when the anomalous first message is received by transmitter-receiver 143, attack determiner 142 determines that first messages include the anomalous first message and the normal first message; and when the anomalous first message is not received by transmitter-receiver 143, attack determiner 142 determines that the first messages do not include the anomalous first message. It should be noted that the predetermined period may be greater than or equal to a transmission cycle of the normal first message.

As stated above, in the present embodiment, since it is determined whether an attack characteristic that adds an anomalous message to a normal message has appeared, it is possible to determine such an attack, that is, the additional attack as the cause of the anomaly appropriately.

Moreover, attack determiner 142 may use attack characteristic 3, that is, the observation of a diagnostic packet. It should be noted that the observation of the diagnostic packet means that a diagnostic packet is observed as a diagnostic message when vehicle 1 is traveling. Specifically, attack determiner 142 determines whether a third message has been transmitted to in-vehicle network 100 when vehicle 1 is traveling, the third message being the above-mentioned diagnostic message transmitted to in-vehicle network 100 from outside vehicle 1 when vehicle 1 is not traveling. When attack determiner 142 determines that the third message has been transmitted when vehicle 1 is traveling, attack determiner 142 determines that the cause of the anomaly is an attack.

For example, attack determiner 142 obtains information about a traveling speed of vehicle 1 from a device of vehicle 1, and determines whether vehicle 1 is traveling, based on the information. In the case where a third message is received by transmitter-receiver 143 when attack determiner 142 determines that vehicle 1 is traveling, based on the information, attack determiner 142 determines that the cause of the anomaly is an attack.

Moreover, attack determiner 142 may use attack characteristic 3a. Specifically, when transmission of a first message is stopped by a diagnostic packet, attack determiner 142 determines whether a first message determined to have an anomaly has been transmitted; and when attack determiner 142 determines that the first message determined to have the anomaly has been transmitted, attack determiner 142 determines that the cause of the anomaly is an attack.

As stated above, in the present embodiment, since it is determined whether an attack characteristic that replaces a normal message with an anomalous message has appeared, it is possible to determine such an attack, that is, the replacement attack as the cause of the anomaly appropriately.

Moreover, attack determiner 142 may use attack characteristic 4, that is, coincidence. It should be noted that the coincidence means that anomalies coincide in various types of mutually related messages (or data). Specifically, attack determiner 142 determines whether a second message determined to have an anomaly has been transmitted by second ECU 120 included in in-vehicle network 100 in the same time period with a first message determined to have an anomaly, the second message being related to the first message. When attack determiner 142 determines that the second message determined to have the anomaly has been transmitted, attack determiner 142 determines that the cause of the anomaly is an attack.

For example, a second message is received by transmitter-receiver 143 within a predetermined time from when an anomalous first message is received by transmitter-receiver 143. When respective IDs of the first message and the second message are mutually associated with each other in a table held in advance, attack determiner 142 determines that the second message is related to the first message. When the second message is determined to have an anomaly by anomaly determiner 141, attack determiner 142 determines that the cause of the anomaly is an attack.

As stated above, in the present embodiment, since it is determined whether an attack characteristic has appeared, it is possible to determine the attack as the cause of the anomaly appropriately.

Here, attack determiner 142 may identify a type of the attack using any two of attack characteristics 1 to 4 shown by FIG. 3, and may give a notification in accordance with those types.

Figure 5:
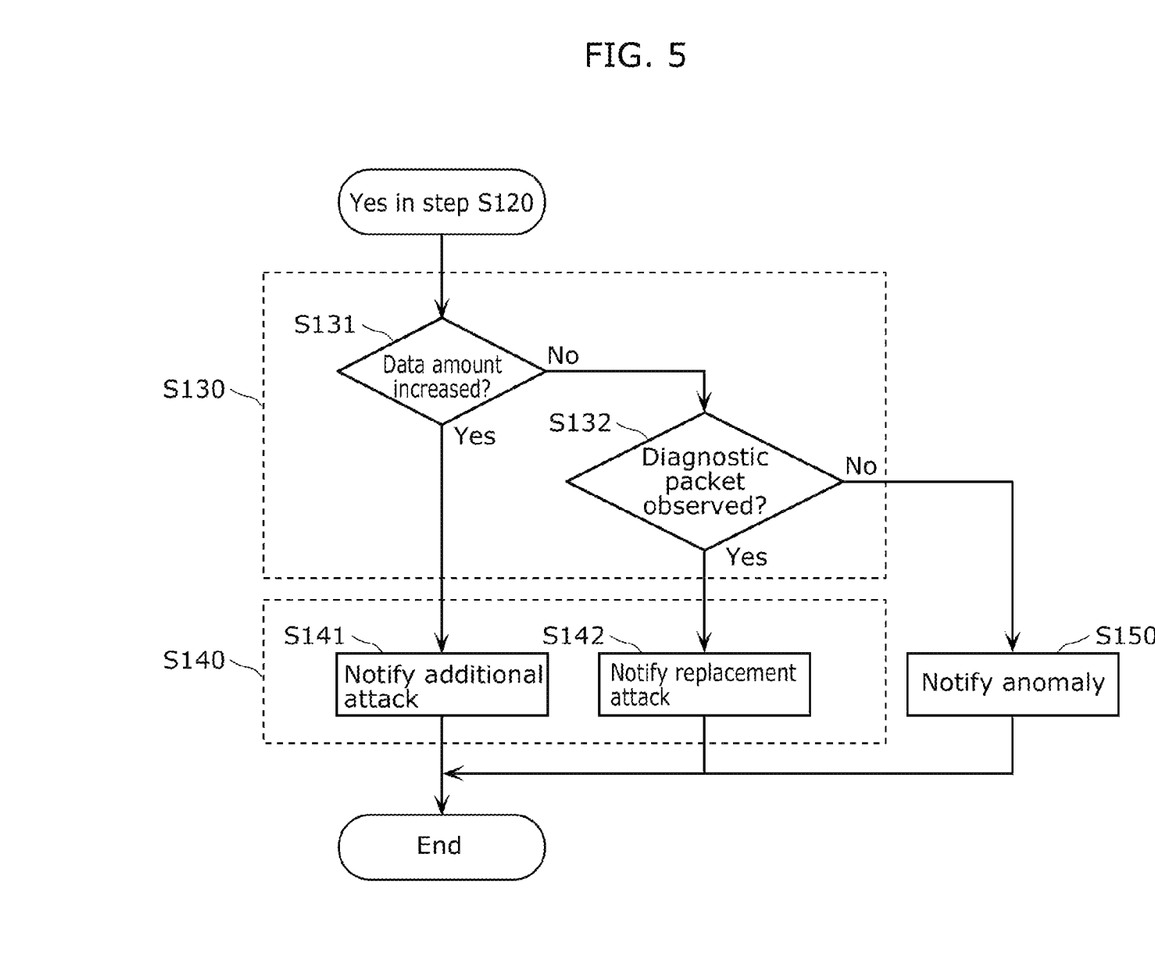
FIG. 5 is a flow chart showing a specific example of a processing operation by an attack determiner in the embodiment.

FIG. 5 is a flow chart showing a specific example of a processing operation by attack determiner 142.

For example, in step S130, attack determiner 142 determines whether attack characteristic 1 has appeared, that is, a data amount has increased (step S131). Here, when attack determiner 142 determines that the data amount has increased (Yes in step S131), attack determiner 142 determines that the cause of the anomaly is an attack, and identifies a type of the attack as an additional attack. As a result, in step S140, attack determiner 142 notifies the user, server 200, or at least one of the devices included in in-vehicle network 100 of the additional attack (step S141).

On the other hand, when attack determiner 142 determines that the data amount has not increased (No in step S131), attack determiner 142 determines whether attack characteristic 3 has appeared, that is, a diagnostic packet has been observed (step S132). Here, when attack determiner 142 determines that the diagnostic packet has been observed (Yes in step S132), attack determiner 142 determines that the cause of the anomaly is an attack, and identifies a type of the attack as a replacement attack. As a result, in step S140, attack determiner 142 notifies the user, server 200, or at least one of the devices included in in-vehicle network 100 of the replacement attack (step S142).

Figure 6:
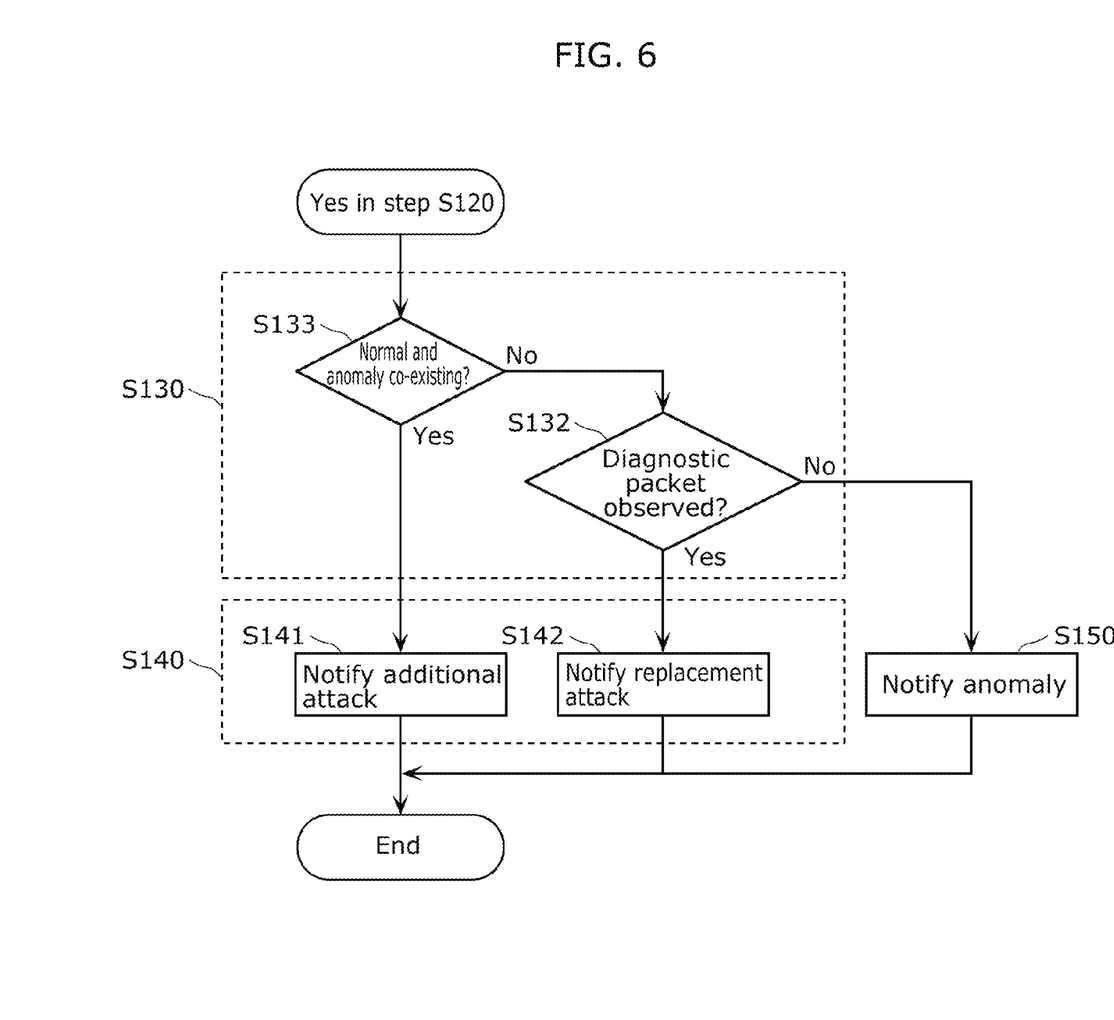
FIG. 6 is a flow chart showing another specific example of the processing operation by the attack determiner in the embodiment.

FIG. 6 is a flow chart showing another specific example of the processing operation by attack determiner 142.

For example, in step S130, attack determiner 142 determines whether attack characteristic 2 has appeared, that is, the coexistence of a normal message and an anomalous message has occurred as a change in data (step S133). Here, when attack determiner 142 determines that the coexistence has occurred (Yes in step S133), attack determiner 142 determines that the cause of the anomaly is an attack, and identifies a type of the attack as an additional attack. As a result, in step S140, attack determiner 142 notifies the user, server 200, or at least one of the devices included in in-vehicle network 100 of the additional attack (step S141).

On the other hand, when attack determiner 142 determines that the coexistence has not occurred (No in step S133), attack determiner 142 determines whether attack characteristic 3 has appeared, that is, a diagnostic packet has been observed (step S132). Here, when attack determiner 142 determines that the diagnostic packet has been observed (Yes in step S132), attack determiner 142 determines that the cause of the anomaly is an attack, and identifies a type of the attack as a replacement attack. As a result, in step S140, attack determiner 142 notifies the user, server 200, or at least one of the devices included in in-vehicle network 100 of the replacement attack (step S142).

Figure 7:
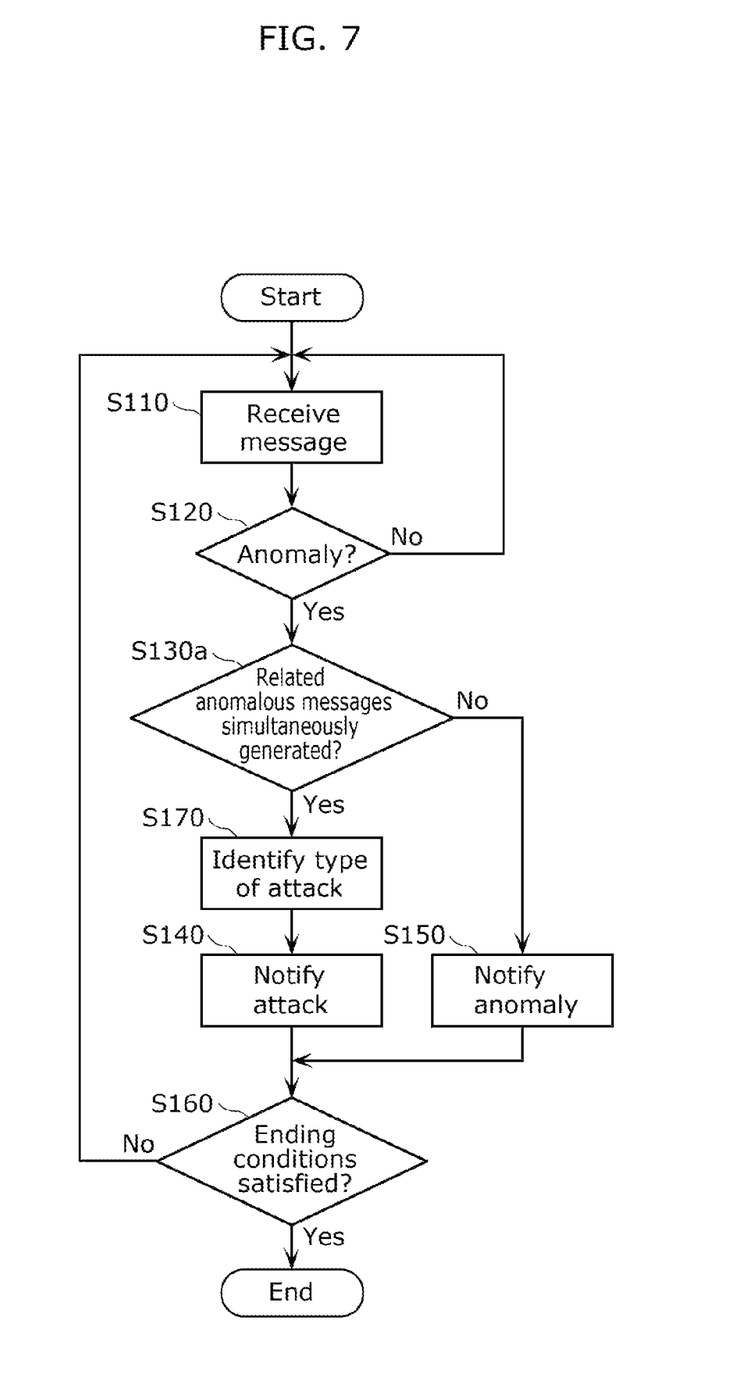
FIG. 7 is a flow chart showing another example of the overall processing operation by the attack detection device in the embodiment.

FIG. 7 is a flow chart showing another example of the overall processing operation by attack detection device 140. It should be noted that among the steps shown by the flow chart of FIG. 7, those that are the same as the steps shown by the flow chart of FIG. 4 are assigned the same reference signs as FIG. 4, and a detailed description thereof is omitted.

Attack determiner 142 may determine whether a cause of an anomaly is an attack, and when attack determiner 142 determines that the cause of the anomaly is the attack, attack determiner 142 may further identify a type of the attack.

For example, when transmitter-receiver 143 receives a message and anomaly determiner 141 determines that the message has an anomaly, attack determiner 142 of attack detection device 140 determines whether a characteristic common to the additional attack and the replacement attack has appeared (step S130a). In other words, as shown by FIG. 7, attack determiner 142 determines whether attack characteristic 4 has appeared, that is, mutually related anomalous messages have coincided, as a specific process in step S130 shown by FIG. 4 (step S130a). Here, when attack determiner 142 determines that the mutually related anomalous messages have coincided (Yes in step S130a), attack determiner 142 determines that the cause of the anomaly is an attack, and further identifies a type of the attack (step S170). To put it another way, attack determiner 142 detects which of attack characteristics 1 to 3 has appeared, and identifies, as the type of the attack, a type according to the characteristic that has appeared. For example, when attack determiner 142 detects the appearance of one of attack characteristics 1 and 2, attack determiner 142 identifies the additional attack according to the one attack characteristic as the type of the attack. Alternatively, when attack determiner 142 detects the appearance of attack characteristic 3, attack determiner 142 identifies the replacement attack according to attack characteristic 3 as the type of the attack.

More specifically, in in-vehicle network 100, each of first messages including a first message determined to have an anomaly has been transmitted sequentially, and a first data amount of the first messages transmitted per unit of time has increased from a second data amount of normal first messages transmitted per unit of time. In such a case, in the identification of a type of an attack in step S170, attack determiner 142 identifies, as the type of the attack, the additional attack that adds an anomalous message to a normal message. In other words, when attack determiner 142 determines that the first data amount of the first messages transmitted per unit of time has increased from the second data amount of the normal first messages transmitted per unit of time, attack determiner 142 identifies, as the type of the attack, the additional attack that adds the anomalous message to the normal message.

Moreover, in in-vehicle network 100, each of the first messages including the first message determined to have the anomaly has been transmitted sequentially, and the first messages include an anomalous first message and a normal first message. In such a case, in the identification of a type of an attack in step S170, attack determiner 142 identifies, as the type of the attack, the additional attack that adds an anomalous message to a normal message. In other words, when attack determiner 142 determines that the first messages include the anomalous first message and the normal first message, attack determiner 142 identifies, as the type of the attack, the additional attack that adds the anomalous message to the normal message.

Alternatively, a third message that is transmitted from outside vehicle 1 to in-vehicle network 100 when vehicle 1 is not traveling has been transmitted to in-vehicle network 100 when vehicle 1 is traveling. In such a case, in the identification of a type of an attack in step S170, attack determiner 142 identifies, as the type of the attack, the replacement attack that replaces a normal message with an anomalous message. In other words, when attack determiner 142 determines that a third message that is transmitted from outside vehicle 1 to in-vehicle network 100 when vehicle 1 is not traveling has been transmitted to in-vehicle network 100 when vehicle 1 is traveling, attack determiner 142 identifies, as the type of the attack, the replacement attack that replaces the normal message with the anomalous message. Alternatively, when attack determiner 142 determines that a first message determined to have the anomaly has been transmitted when transmission of a first message is stopped by a diagnostic packet, attack determiner 142 identifies, as the type of the attack, the replacement attack that replaces the normal message with the anomalous message.

Accordingly, it is possible to more accurately determine an attack determined as an event that has occurred in a network.

As stated above, the electronic control unit and the electronic control system in the present embodiment make it possible to more accurately determine an event that has occurred in in-vehicle network 100.

[Variations]

Although the electronic control unit according to one or more aspects have been described above based on the foregoing embodiment, the present disclosure is not limited to the foregoing embodiment. Various modifications to the present embodiment that can be conceived by a person with an ordinary skill in the art or those forms obtained by combining elements in different embodiments may be included in the scope of the one or more aspects, as long as the modifications and forms do not depart from the essence of the present disclosure.

For example, in the foregoing embodiment, attack determiner 142 determines whether any one or two of attack characteristics 1 to 4 shown by FIG. 3 have appeared, and determines whether a cause of the anomaly is an attack, based on a result of the determination. However, when at least three of above-described attack characteristics 1 to 4 appear in the same time period, attack determiner 142 may determine that a cause of the anomaly is an attack. In other words, attack determiner 142 determines whether at least one characteristic caused to appear by an attack has appeared in in-vehicle network 100 within a predetermined time, and when attack determiner 142 determines that the at least one characteristic has appeared, attack determiner 142 determines that a cause of the anomaly is an attack. The at least one characteristic may be one of attack characteristics 1 to 4. In addition, when the same characteristic appears multiple times within the above-described time, attack determiner 142 may determine that a cause of the anomaly is an attack.

Moreover, although attack determiner 142 determines that the cause of the anomaly is the replacement attack, based on attack characteristic 3 in the foregoing embodiment, attack determiner 142 may determine that the cause of the anomaly is the replacement attack, based on another characteristic. For example, as shown by FIG. 3, in the case of the replacement attack, data (i.e., a value) included in a message cyclically transmitted change steeply. Accordingly, attack determiner 142 may determine that the cause of the anomaly is the replacement attack, based on such a characteristic.

It should be noted that, in the foregoing embodiment, the respective elements may be configured using dedicated hardware or may be realized by executing a software program suitable for the respective elements. Each of the elements may be implemented by a program executer, such as a CPU or a processor, reading and executing a software program recorded on a recording medium, such as a hard disk or a semiconductor memory. Here, software that implements, for example, the electronic control unit or the electronic control system in the foregoing embodiment causes a computer to execute respective steps included in the flow charts shown by FIG. 4 to FIG. 7.

Moreover, the in-vehicle network 100 is a network system based on the CAN protocol in the foregoing embodiment. The CAN protocol may be interpreted broadly as including derivative protocols, such as Time-Triggered CAN and CAN with Flexible Data Rate (CANFD). Furthermore, a network used for communication between ECUs in a vehicle is not limited to a network according to the CAN protocol, and may be another network. Examples of a protocol other than CAN used by a network in which ECUs transmit and receive communication data include an Ethernet (registered trademark) protocol, a Local Interconnect Network (LIN) protocol, a Media Oriented Systems Transport (MOST (registered trademark)) protocol, a FlexRay (registered trademark) protocol, and a BroadR-Reach protocol.

Moreover, each ECU in the foregoing embodiment is defined as a device including, for example, a processor, a digital circuit such as memory, an analog circuit, and a communication circuit, but may also include a hard disk, a display, and other hardware elements. Furthermore, the functionality of each device described in the foregoing embodiment may be implemented by dedicated hardware (e.g., a digital circuit) instead of software causing a processor to execute a program recorded on memory.

Moreover, in-vehicle network 100 is a network system installed in vehicle 1 in the foregoing embodiment, but may be installed in a mobile body other than a vehicle such as construction equipment, farm equipment, a ship, a train, and an airplane.

Moreover, a part or all of the elements in each of the devices according to the foregoing embodiment may be implemented into a single Large Scale Integration (LSI). The system LSI is a super multi-function LSI that is a single chip into which a plurality of elements are integrated. More specifically, the system LSI is a computer system including a microprocessor, a ROM, a RAM, and the like. The RAM stores a computer program. The microprocessor operates according to the computer program, thereby causing each of the elements to execute the function. Furthermore, each of the elements included in each of the above-described devices may be integrated separately, or a part or all of them may be integrated into a single chip. The system LSI is described here, but the integrated circuit may also be referred to as an integrated circuit (IC), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used. Further, when development of a semiconductor technology or another derived technology provides a circuit integration technology which replaces LSI, as a matter of course, functional blocks may be integrated by using this technology. Adaption of biotechnology, for example, is a possibility.

Moreover, a part or all of the elements included in each of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

Moreover, one aspect of the present disclosure may be an electronic control method including, for example, part or all of the procedures shown by FIG. 4 to FIG. 7. Furthermore, one aspect of the present disclosure may be a program for allowing a computer (a computer program) to perform the process according to the electronic control method, or may be digital signals made up of the program.

Moreover, one aspect of the present disclosure may be the computer program or the digital signals recorded on a computer-readable recording medium, such as a flexible disk, a hard disk, a CD-ROM, an MO, a DVD, DVD-ROM, DVD-RAM, Blue-ray (registered trademark) disc (BD), and a semiconductor memory. In addition, one aspect of the present disclosure may be the digital signals recorded on these recording media.

Moreover, one aspect of the present disclosure may be the program or the digital signals transmitted via a telecommunication line, a wireless or wired communication line, a network represented by the Internet, a data broadcast, and so on. Furthermore, one aspect of the present disclosure may be a computer system including a microprocessor and memory, in which the memory stores the program and the microprocessor operates according to the program. In addition, the program or the digital signals may be performed by another independent computer system by transmitting the program or the digital signals recorded on the recording medium, or by transmitting the program or the digital signals via the network etc.

The scope of the present disclosure encompasses forms obtained by combining any of the elements and functions described in the foregoing embodiment and the variations. While various embodiments have been described herein above, it is to be appreciated that various changes in form and detail may be made without departing from the spirit and scope of the present disclosure as presently or hereafter claimed.

INDUSTRIAL APPLICABILITY

The present disclosure makes it possible to more accurately determine an event that has occurred in a network, and is applicable to, for example, a network in which control according to a CAN protocol is performed.

The invention claimed is:

1. An electronic control unit, comprising:
a processor; and
a memory which stores an instruction, wherein when the processor executes the instruction stored in the memory, the processor operates as:
a receiver that receives first messages transmitted from a first device included in a network installed in a mobile body; and
a determiner that, when a first message among the first messages received by the receiver is determined to have an anomaly, determines whether a cause of the anomaly is an attack on the network, and outputs a result of the determination,
wherein when the determiner determines that the cause of the anomaly is not the attack, the determiner further outputs information indicating a possibility of a breakdown of the first device,
wherein when the determiner determines that the cause of the anomaly is the attack, the determiner further identifies a type of the attack, and
wherein when the determiner determines that a second message has been transmitted to the network when the mobile body is moving, the determiner identifies, as the type of the attack, a replacement attack that replaces a normal message with an anomalous message, the second message being transmitted from outside the mobile body to the network when the mobile body is not moving.

2. The electronic control unit according to claim 1, wherein the determiner determines whether a first data amount of the first messages transmitted per unit of time has increased from a second data amount of normal first messages transmitted per unit of time, and when the determiner determines that the first data amount has increased from the second data amount, the determiner determines that the cause of the anomaly is the attack.

3. The electronic control unit according to claim 1, wherein the determiner determines whether the first messages include an anomalous first message and a normal first message, and when the determiner determines that the first messages include the anomalous first message and the normal first message, the determiner determines that the cause of the anomaly is the attack.

4. The electronic control unit according to claim 1, wherein the determiner determines whether a second message that is determined to have an anomaly has been transmitted from a second device included in the network in a same time period with the first message determined to have the anomaly, and when the determiner determines that the second message has been transmitted, the determiner determines that a cause of the anomaly is the attack, the second message being related to the first message determined to have the anomaly.

5. The electronic control unit according to claim 1, wherein the determiner determines whether a third message has been transmitted to the network when the mobile body is moving, and when the determiner determines that the third message has been transmitted, the determiner determines that the cause of the anomaly is the attack, the third message being transmitted from outside the mobile body to the network when the mobile body is not moving.

6. The electronic control unit according to claim 1, wherein the determiner determines whether the first message determined to have the anomaly has been transmitted when transmission of a first message is stopped by a diagnostic packet, and when the determiner determines that the first message determined to have the anomaly has been transmitted, the determiner determines that the cause of the anomaly is the attack.

7. The electronic control unit according to claim 1, wherein the determiner determines whether at least one characteristic that appears due to an attack has appeared in the network within a predetermined time period, and when the determiner determines that the at least one characteristic has appeared, the determiner determines that the cause of the anomaly is the attack.

8. The electronic control unit according to claim 1, wherein when the determiner determines that a first data amount of the first messages transmitted per unit of time has increased from a second data amount of normal first messages transmitted per unit of time, the determiner identifies, as the type of the attack, an additional attack that adds an anomalous message to a normal message.

9. The electronic control unit according to claim 1, wherein when the determiner determines that the first messages include an anomalous first message and a normal first message, the determiner identifies, as the type of the attack, an additional attack that adds an anomalous message to a normal message.

10. The electronic control unit according to claim 1, wherein when the determiner determines that a first message determined to have the anomaly has been transmitted when transmission of the first message is stopped by a diagnostic packet, the determiner identifies, as the type of the attack, a replacement attack that replaces a normal message with an anomalous message.

11. An electronic control system, comprising:
an anomaly determining device including a receiver that receives messages transmitted from a device included in a network installed in a mobile body, and an anomaly determiner that determines whether the messages received by the receiver are anomalies; and
an attack determining device that, when the anomaly determiner determines that a message among the messages received by the receiver has an anomaly, determines whether a cause of the anomaly is an attack on the network, and outputs a result of the determination,
wherein when the attack determining device determines that the cause of the anomaly is not the attack, the attack determining device further outputs information indicating a possibility of a breakdown of the device included in the network,
wherein when the determiner determines that the cause of the anomaly is the attack, the determiner further identifies a type of the attack, and
wherein when the determiner determines that a second message has been transmitted to the network when the mobile body is moving, the determiner identifies, as the type of the attack, a replacement attack that replaces a normal message with an anomalous message, the second message being transmitted from outside the mobile body to the network when the mobile body is not moving.

* * * * *